(12) United States Patent
Akiyama

(10) Patent No.: US 6,851,811 B2
(45) Date of Patent: Feb. 8, 2005

(54) PROJECTOR INCLUDING A RELAY OPTICAL SYSTEM

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/352,926

(22) Filed: Jan. 29, 2003

(65) Prior Publication Data

US 2004/0165156 A1 Aug. 26, 2004

(30) Foreign Application Priority Data

Feb. 8, 2002 (JP) ........................... 2002-032251

(51) Int. Cl.[7] ............... G03B 21/26; G03B 21/28; G03B 21/20; G02F 1/1335; H04N 9/12

(52) U.S. Cl. ............... 353/31; 353/34; 353/37; 353/69; 353/84; 353/99; 353/102; 349/5; 349/6; 349/7; 349/8; 348/743; 359/889

(58) Field of Search ............... 353/20, 31, 34, 353/37, 69, 84, 98, 99, 102; 349/5, 6, 7, 8; 348/743; 359/889

(56) References Cited

U.S. PATENT DOCUMENTS

| | | | | |
|---|---|---|---|---|
| 6,474,818 B1 | * | 11/2002 | Engle | ........................... 353/84 |
| 6,547,396 B1 | * | 4/2003 | Svardal et al. | ................. 353/8 |
| 6,698,891 B2 | * | 3/2004 | Kato | ........................... 353/20 |
| 6,702,446 B2 | * | 3/2004 | De Vaan et al. | .............. 353/84 |
| 2004/0070738 A1 | * | 4/2004 | Sekiguchi et al. | .......... 353/102 |

* cited by examiner

*Primary Examiner*—Judy Nguyen
*Assistant Examiner*—Melissa J Koval
(74) *Attorney, Agent, or Firm*—Oliff & Berridge, PLC

(57) ABSTRACT

A relay optical system, which focuses light from a light outgoing plane of an integrator rod into an image on a predetermined illumination area, has a first optical element for correcting at least a distortion aberration, and a second optical element for correcting at least a chromatic aberration. The first optical element includes at least one focusing lens having a non-spherical convex plane, and the second optical element includes at least one diverging lens having a spherical concave lens. The diverging lens is composed of a relatively high dispersive optical glass material having an Abbe's number of not greater than 40. The focusing lens is composed of either an acrylic resin material or an olefin resin material. This arrangement focuses light into an image as an illumination area with a high accuracy and thereby enhances the quality of a resulting displayed image in a projector based on SCR technique.

18 Claims, 8 Drawing Sheets

424 422

422 424

430a 430b 432
  └──┬──┘
     430

432 430b 430a
       └──┬──┘
          430

T=0

T=1

APPROPRIATE STATE

POSITIONAL DEVIATION

BLURRED IRRADIATION

DISTORTED IRRADIATION

RELATED ART

PROJECTOR INCLUDING A RELAY OPTICAL SYSTEM

BACKGROUND OF THE INVENTION

1. Field of the Invention

The present invention relates to a projector (projection display apparatus) that projects and displays images.

2. Description of the Related Art

The projector generally uses light emitted from a light source unit as illumination light to irradiate an illumination area (light illumination plane) of an electro-optic device. The electro-optic device modulates the incident light entering through its light illumination plane according to image information (image signals), and outputs image light representing a resulting image. The image light output from the electro-optic device is projected on a screen via a projection optical system, so that a resulting image is displayed. Typical examples of the electro-optic device include micromirror light modulators, such as a Digital Micro-mirror Device (DMD, trade mark by TI Corp.) and liquid crystal panels. The DMD is an electro-optic device having a higher utilization efficiency of the light irradiating the light illumination plane, compared with the liquid crystal panel.

A projector utilizing one electro-optic device (called 'single-panel projector') may attain color display in the following manner. The single-panel projector uses a color wheel including three color filters corresponding to three primary colors, red (R), green (G), and blue (B). The color wheel cyclically and sequentially allows transmission of the three primary color light components, R, G, and B included in the incident illumination light. The three primary color light components transmitted through and output from the color wheel sequentially irradiate the light illumination plane of the electro-optic device. The electro-optic device modulates the sequentially irradiated color light components according to corresponding color signals and thereby generates image rays corresponding to the color signals. Images corresponding to the generated image rays of the respective colors (called 'color component images') are sequentially projected. The persistence of vision of human eyes combines the sequentially projected three color component images to one composite color image.

Color light components that are not transmitted through the color wheel are wasted in the process of sequentially displaying the color component images corresponding to the three primary color components, R, G, and B and generating a resulting color image. This technique is called time sharing display or field sequential display. When the color wheel transmits the R color light component, the G and B color light components are wasted. When the color wheel transmits the G color light component, the B and R color light components are wasted. When the color wheel transmits the B color light component, the R and G color light components are wasted. This arrangement accordingly does not allow the light emitted from the light source unit to be fully utilized as illumination light, and lowers the light utilization efficiency.

A method of solving the drawback discussed above and enhancing the light utilization efficiency has been proposed in the reference 'Sequential Color Recapture and Dynamic Filtering: A Method of Scrolling Color' (D. Scott Dewald, Steven M. Penn, and Michael Davis, Society for Information Display 2001. International Symposium Digest of Technical Papers, Volume XXXII, page 1076.

FIG. 5 is a plan view schematically illustrating the main part of a prior art projector 1000 based on SCR (Sequential Color Recapture) technique, which is described in the above cited reference. This projector (hereafter referred to as 'SCR projector') 1000 includes a light source unit 100, an integrator rod for SCR (hereafter referred to as 'SCR integrator') 200, a color wheel for SCR (hereafter referred to as 'SCR wheel') 300, a relay optical system 400, a reflecting mirror 500, a field lens 600, a DMD 700, and a projection lens (projection optical system) 800, which are sequentially arranged along a system optical path (central axis) $1000ax$.

The light emitted from the light source unit 100 is condensed light, which is substantially focused on a light entrance plane 202 of the SCR integrator 200 on the system optical axis $1000ax$ and thereby efficiently enters through the light entrance plane 202. More specifically, the light source unit 110 includes an elliptical reflector 110 having a spheroidal reflection plane and a light source lamp 120, which is a high-pressure discharge lamp, such as a metal halide lamp or a high-pressure mercury lamp. The light source lamp 120 is located at a first focal point F1 of the elliptical reflector 110, and the SCR integrator 200 is arranged to locate its light entrance plane 202 at a second focal point F2 of the elliptical reflector 110. The light source unit 100 of this construction emits the condensed light, which is substantially focused on the light entrance plane 202 of the SCR integrator 200 on the system optical axis $1000ax$.

An image focused on the light entrance plane 202 of the SCR integrator 200 (hereafter referred to as 'secondary light source image') has a dimension (either a dimension in a lateral direction or a dimension in a vertical direction) DSP, which is expressed by Equation (1) given below:

$$DSP = DA \cdot f2/f1 \qquad (1)$$

where DA denotes a dimension (either a dimension in the lateral direction or a dimension in the vertical direction) of an arc image of the light source lamp 120, f1 denotes a first focal length of the elliptical reflector 110, and f2 denotes a second focal length of the elliptical reflector 110.

As clearly understood from Equation (1), the dimension of the secondary light source image is adjustable by selecting adequate one among multiple elliptical reflectors having different first focal lengths f1 or different second focal lengths f2.

The light entering the SCR integrator 200 through the light entrance plane 202 is repeatedly reflected inside the SCR integrator 200 and is output from a light outgoing plane 204. The SCR integrator 200 makes the incident light repeatedly reflected therein and thus functions to convert the incident light of a non-uniform illuminance distribution entering through the light entrance plane 202 into light of a uniform illuminance distribution and output the converted light of the uniform illuminance distribution from the light outgoing plane 204.

FIG. 6 shows the structure of the SCR integrator 200. FIG. 6(B) is a plan view of the SCR integrator 200. FIG. 6(A) is a side view of the SCR integrator 200 on the side of the light entrance plane 202. FIG. 6(C) is a side view of the SCR integrator 200 on the side of the light outgoing plane 204. The SCR integrator 200 is a translucent rod of a quadratic prism having rectangular light entrance plane 202 and light outgoing plane 204. The light outgoing plane 204 generally has the contour similar to the contour of a light illumination plane (illumination area) of the DMD 700 by taking into account the illumination efficiency on the light illumination plane. For example, the light illumination plane of the DMD 700 has an aspect ratio (horizontal to vertical ratio) of about 4 to 3 or about 16 to 9. The light outgoing plane 204 is thus designed to have the similar aspect ratio of about 4 to 3 or about 16 to 9.

A reflecting mirror 206 is formed on the surface of the light entrance plane 202 to have a reflection plane in contact with the light entrance plane 202. The reflecting mirror 206 has a circular opening 206a around a central axis 200ax of the SCR integrator 200, which is located to be coincident with the system optical axis 1000ax. Only the light passing through the opening 206a can enter the SCR integrator 200 through the light entrance plane 202. It is accordingly preferable to adjust the dimension DSP of the secondary light source image expressed by Equation (1) to be smaller than the dimension of the opening 206a. This arrangement enables the light to efficiently pass through the opening 206a and enter the SCR integrator 200 through the light entrance plane 202. The light reflecting functions of the reflecting mirror 206 will be discussed later.

The dimension of the opening 206a is appropriately set by taking into account the entrance efficiency of the incident light from the light source unit 100 into the SCR integrator 200 and the light reflection efficiency of the reflecting mirror 206, which will be discussed later. The diameter of the opening 206a is typically about ⅓ of the longitudinal length of the reflecting mirror 206.

The reflecting mirror 206 is produced by forming an aluminum film, a silver film, or the like over the light entrance plane 202 except an area corresponding to the opening 206a. The reflecting mirror 206 may alternatively be produced by depositing a dielectric multilayer film (for example, cold mirror) or by applying an ESR film (manufactured by 3M). A flat transparent body (for example, a glass plate) with an aluminum film, a silver film, a dielectric multilayer film, or an ESR film selectively formed thereon may be disposed close to the light entrance plane 202 or may be applied on the light entrance plane 202.

Referring back to FIG. 5, the light output from the light outgoing plane 204 of the SCR integrator 200 enters the SCR wheel 300.

FIG. 7 shows the structure of the SCR wheel 300. The SCR wheel 300 has a disc-shaped filter plane 310, which is rotatable about a rotating shaft 320 by means of a motor (not shown). Borderlines of R, G, and B color filters (solid-line curves) are arranged to form a spiral of Archimedes about the center point of the rotating shaft 320 on the filter plane 310. Each of the R, G, and B color filters allows transmission of only the corresponding color light component, while reflecting the other color light components. These color filters are formed by coating the filter plane 310 with corresponding dichroic films.

The filter plane 310 of the SCR wheel 300 is disposed close to and parallel to the light outgoing plane 204 of the SCR integrator 200.

The light output from the light outgoing plane 204 of the SCR integrator 200 enters multiple color filters at a certain timing as shown by the broken line in FIG. 7. Each of the multiple color filters receiving the incident light allows transmission of only the corresponding color light component, while reflecting the other color light components.

FIG. 8 shows the light reflected by the SCR wheel 300. For example, an R light component transmission filter 310R formed on the filter plane 310 of the SCR wheel 300 receives the incident light from the light outgoing plane 204 of the SCR integrator 200, and allows transmission of only the R light component while reflecting the G light component and the B light component. The reflected G light component and B light component re-enter the SCR integrator 200 from the light outgoing plane 204.

The reflected G light component and B light component (hereafter referred to as 'GB light components') are repeatedly reflected inside the SCR integrator 200 and go toward the light entrance plane 202. The reflecting mirror 206 is formed on the light entrance plane 202. The GB light components reaching the light entrance plane 202 are reflected by the reflecting mirror 206, while partly passing through the opening 206a of the reflecting mirror 206.

The GB light components reflected by the reflecting mirror 206 are repeatedly reflected inside the SCR integrator 200, go toward the light outgoing plane 204, and are eventually output from the light outgoing plane 204 to re-enter the SCR wheel 300. Each of the GB light components entering a corresponding transmissible color filter on the SCR wheel 300, that is, the G light component entering a G light component transmission filter 310G or the B light component entering a B light component transmission filter 310B, passes through the SCR wheel 300 to be available as effective illumination light. Each of the GB light components entering the non-transmissible color filter, that is, the R light component transmission filter 310R, on the SCR wheel 300 is reflected again and iteratively reciprocates in the SCR integrator 200 until entering the transmissible color filter to be available as effective illumination light.

The above description regards the incident light first entering the R light component transmission filter 310R. The description is also adaptable to the incident light first entering the G light component transmission filter 310G and the incident light first entering the B light component transmission filter 310B.

This structure enables recycle of the light rays that are reflected by the SCR wheel 300 and thereby reduces the waste of light caused by the color wheel in the field sequential display, thus attaining efficient use of the light emitted from the light source unit 100. The technique of recycling the light in this manner is called the 'SCR technique'.

The relay optical system 400 functions to focus the light passing through the SCR wheel 300 into an image on the light illumination plane of the DMD 700 at a preset imaging magnification. The relay optical system 400 has at least one focusing lens. The image formed on the light illumination plane of the DMD 700 corresponds to the illumination area. The filter plane 310 of the SCR wheel 300 is located close to the light outgoing plane 204 of the SCR integrator 200. It may thus be thought that the function of the relay optical system 400 focuses the light from the light outgoing plane 204 of the SCR integrator 200 into an image on the light illumination plane of the DMD 700 at the preset imaging magnification. The focused image has a dimension (either a dimension in the lateral direction or a dimension in the vertical direction) DB, which is expressed by Equation (2) given below:

$$DB = DI \cdot ks \qquad (2)$$

where DI denotes a dimension (either a dimension in the lateral direction or a dimension in the vertical direction) of the light outgoing plane 204 of the SCR integrator 200, and ks denotes the imaging magnification.

The imaging magnification ks is set to make the dimension (either the dimension in the lateral direction or the dimension in the vertical direction) DB of the focused image (illumination area) substantially equal to the dimension of the light illumination plane of the DMD 700. Such setting allows the light illumination plane of the DMD 700 to be efficiently illuminated. The imaging magnification ks is generally set in a range of about 1.5 times to 2.5 times.

The reflecting mirror 500 reflects the light, such that the light output from the relay optical system 400 enters the DMD 700 via the field lens 600. The reflecting mirror 500 is not an essential constituent but may be omitted.

The DMD 700 is a reflecting direction control-type light modulator, which reflects the light irradiating its light illumination plane according to image signals (image information) by means of each micromirror corresponding to each pixel and thereby makes image light, which represents an image, go out toward the projection lens 800. The image light output from the DMD 700 is projected via the field lens 600 and the projection lens 800. A resulting image corresponding to the image light is thus projected and displayed.

Due to the restrictions on the function of the DMD 700 for controlling the reflecting direction, the system optical axis 1000ax from the reflecting mirror 500 to the DMD 700 is arranged to have a predetermined gradient relative to the system optical axis 1000ax from the DMD 700 to the projection lens 800 (this is parallel to the normal line of the light illumination plane of the DMD 200). The 'light illumination plane' of the DMD 700 here means an area where the irradiated light is usable as image light, that is, an area with micro mirrors formed thereon. The 'predetermined gradient' is not essential for the characteristics of the present invention and is thus not specifically described here.

FIG. 9 schematically shows an image of the light passing through the SCR wheel 300. The light output from the light outgoing plane 204 of the SCR integrator 200 enters multiple color filters at a certain timing as shown by the broken line in FIG. 7. The light passing through the SCR wheel 300 is divided into multiple color light component areas R, G, and B as shown in FIG. 9. The borderlines of the multiple color filters shift in the radial direction with a rotation of the SCR wheel 300. With this shift, the pattern of the multiple color light component areas R, G, and B of the light passing through the SCR wheel 300 is changed, for example, from the state at a display timing T=0 shown in FIG. 9(A) to the state at a display timing T=1 shown in FIG. 9(B). The display timing represents a unit time for updating data of the displayed image.

It is thus required to supply an image signal representing a color component image, which corresponds to the color of the light irradiating each pixel of the DMD 700, to the pixel at a certain display timing. The color pattern of the irradiated light is varied, for example, with a rotation of the SCR wheel 300. The color pattern of the irradiated light may unequivocally be determined according to the position of a reference point (not shown) on the SCR wheel 300. The image processing circuit monitors the position of the reference point, specifies color pattern information of the irradiated light corresponding to the monitored position, generates the image signal based on the specified pattern information, and supplies the image signal to the DMD 700.

FIG. 10 shows problems arising in the prior art SCR projector 1000. Each drawing of FIG. 10 shows the state of dividing the image signal supplied to each pixel of the DMD 700 into multiple color light component areas at a certain display timing. The broken line in each drawing represents a color light borderline between an R light component area and a B light component area, among color light borderlines between multiple color light component areas of the light irradiating each pixel. As shown in FIG. 10(A), it is preferable that the color light borderline between the R light component area and the B light component area is coincident with a borderline between an R image area and a B image area shown by the solid line. Positional deviation of the color light borderline as shown in FIG. 10(B), blurry irradiation of the color light borderline as shown in FIG. 10(C), or distorted irradiation of the color light borderline as shown in FIG. 10(D) causes the color of the light irradiating a pixel to be different from the color of the image signal supplied to the pixel. This leads to deteriorated quality of the resulting displayed image.

In the projector based on the SCR technique, the requirement is to focus all borderlines between divisional areas of multiple color light components, which are included in the light passing through the SCR wheel, on the light illumination plane of an electro-optic device with a high accuracy, in the process of focusing the light passing through the SCR wheel into an image on the light illumination plane of the electro-optic device and thereby irradiating the light illumination area of the electro-optic device.

SUMMARY OF THE INVENTION

The object of the present invention is thus to provide a technique of focusing light into an image as an illumination area with a high accuracy and thereby enhancing the quality of a resulting displayed image in a projector based on SCR technique.

In order to attain at least part of the above and the other related objects, the present invention is directed to a projector, which includes: a light source unit that emits condensed light, which is focused at a preset position on a central axis; an integrator rod that has a light entrance plane in a neighborhood of the preset position and uniformizes the light emitted from the light source unit; a color wheel that is located close to a light outgoing plane of the integrator rod; a relay optical system that functions to focus light from the light outgoing plane of the integrator rod into an image on a predetermined illumination area; an electro-optic device that has the predetermined illumination area and generates image light, which represents an image, from light output from the relay optical system to irradiate the predetermined illumination area; and a projection optical system that projects a resulting image corresponding to the image light output from the electro-optic device.

A reflecting mirror is formed on the light entrance plane of the integrator rod. The reflecting mirror has an opening about the central axis and a reflecting plane that is formed to surround the opening and reflects light going from the light outgoing plane to the light entrance plane inside the integrator rod.

The color wheel has multiple reflection-type color filters, each allowing transmission of a desired color light component and reflecting the other color light components, which are arranged thereon in a spiral form to divide the light output from the integrator rod into multiple color light components and allow transmission of the multiple color light components. The color wheel is rotated about a rotating shaft that is parallel to the central axis to cyclically change divisional areas of multiple color light components included in the light passing through the color wheel.

The relay optical system has a first optical element for correcting at least a distortion aberration, and a second optical element for correcting at least a chromatic aberration, among aberrations possibly arising in the image of the light focused on the predetermined illumination area.

In the projector of the present invention, the relay optical system corrects at least the distortion aberration and the chromatic aberration, among the diverse aberrations possibly arising in the image of the light focused on the predetermined illumination area. This arrangement reduces the occurrence of the possible distortion aberration and chromatic aberration and enables all borderlines between divisional areas of multiple color light components included in the light passing through the color wheel to be focused with a high accuracy. This focuses light into an image as the illumination area with a high accuracy and thereby enhances the display quality of a resulting projected image.

In one preferable application, the first optical element includes at least one focusing lens having a non-spherical convex plane, and the second optical element includes at least one diverging lens having a spherical concave lens.

This arrangement facilitates construction of the first optical element and the second optical element.

It is preferable that the diverging lens is composed of a relatively high dispersive optical glass material having an Abbe's number of not greater than 40.

This arrangement gives a high-precision diverging lens for correcting the chromatic aberration.

In another preferable application, the diverging lens is a composite lens, which includes a convex lens having a spherical convex plane joined with a concave lens having a spherical concave plane.

This arrangement also facilitates construction of the second optical element.

It is preferable that the concave lens of the composite lens is composed of a relatively high dispersive optical glass material having an Abbe's number of not greater than 40, or otherwise the convex lens of the composite lens is composed of either one of an ultra-low dispersive optical glass material and an abnormal dispersive optical glass.

This arrangement gives a high-precision diverging lens for correcting the chromatic aberration.

It is preferable that the focusing lens is composed of either an acrylic resin material or an olefin resin material.

This arrangement facilitates construction of a high-precision first optical element for correcting the distortion aberration.

In one preferable embodiment, the projector of the present invention having any of the above arrangements further includes an infrared reflection filter that is disposed in an optical path between the light source unit and the relay optical system and reflects infrared radiation of about 700 nm to about 2000 nm.

This arrangement effectively prevents deterioration of the properties occurring in the relay optical system by the infrared radiation of about 700 nm to about 2000 nm.

The above and other objects, features, aspects, and advantages of the present invention will become more apparent from the following detailed description of the preferred embodiment with the accompanying drawings.

DESCRIPTION OF THE PREFERRED EMBODIMENTS

A. Embodiment

Figure 1:
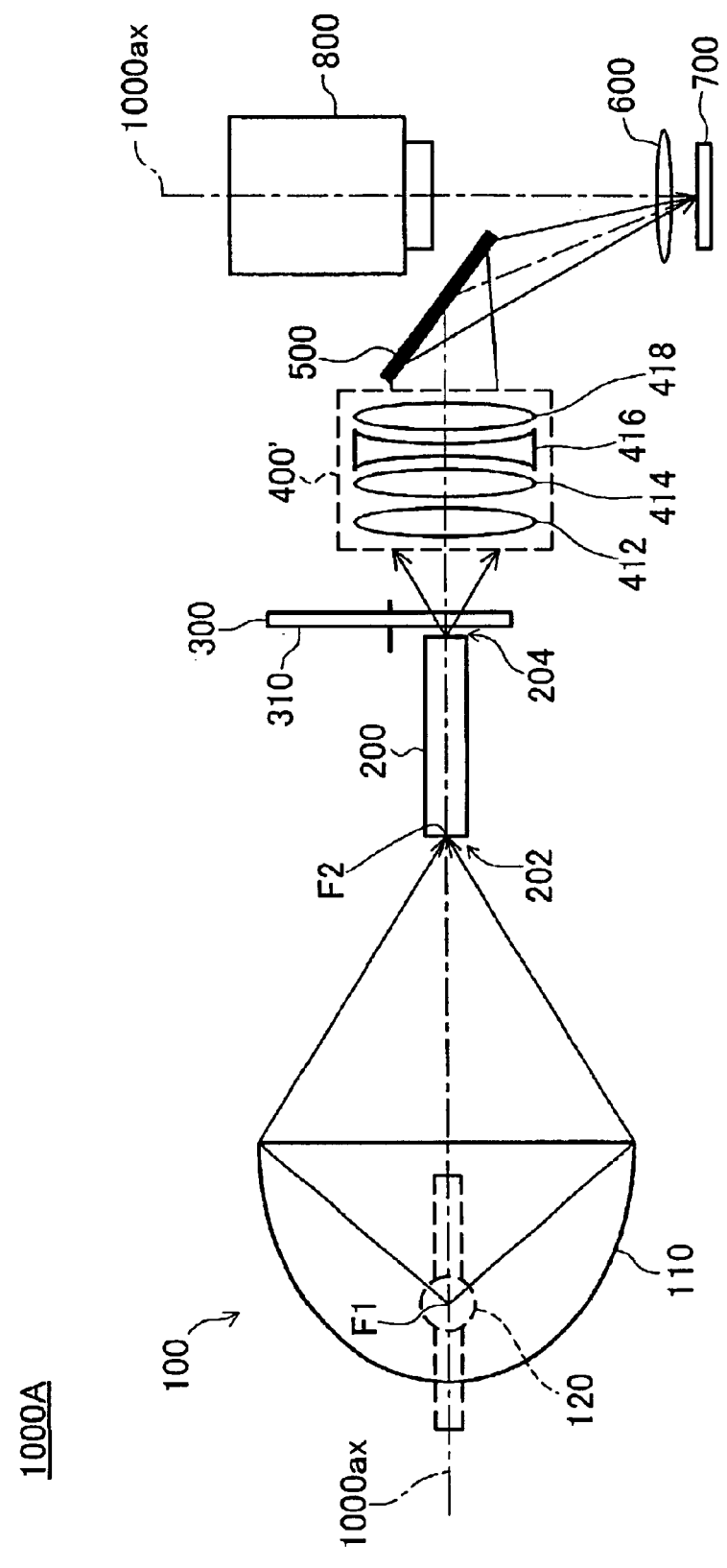
FIG. 1 is a plan view schematically illustrating the main part of a projector in one embodiment of the present invention.

FIG. 1 is a plan view schematically illustrating the main part of a projector 1000A in one embodiment of the present invention. The projector 1000A has a similar structure to that of the prior art projector 1000 discussed above, except that the relay optical system 400 is replaced by another relay optical system 400'. The respective components 100, 200, 300, 400', 600, 700, and 800 except the reflecting mirror 500 are the minimum required constituents for the SCR projector. Other optical elements like reflecting mirrors and lenses may be arranged appropriately between adjoining components. The functions of the respective components are identical with those discussed in the prior art structure. The following mainly describes the relay optical system 400'.

Figure 5:
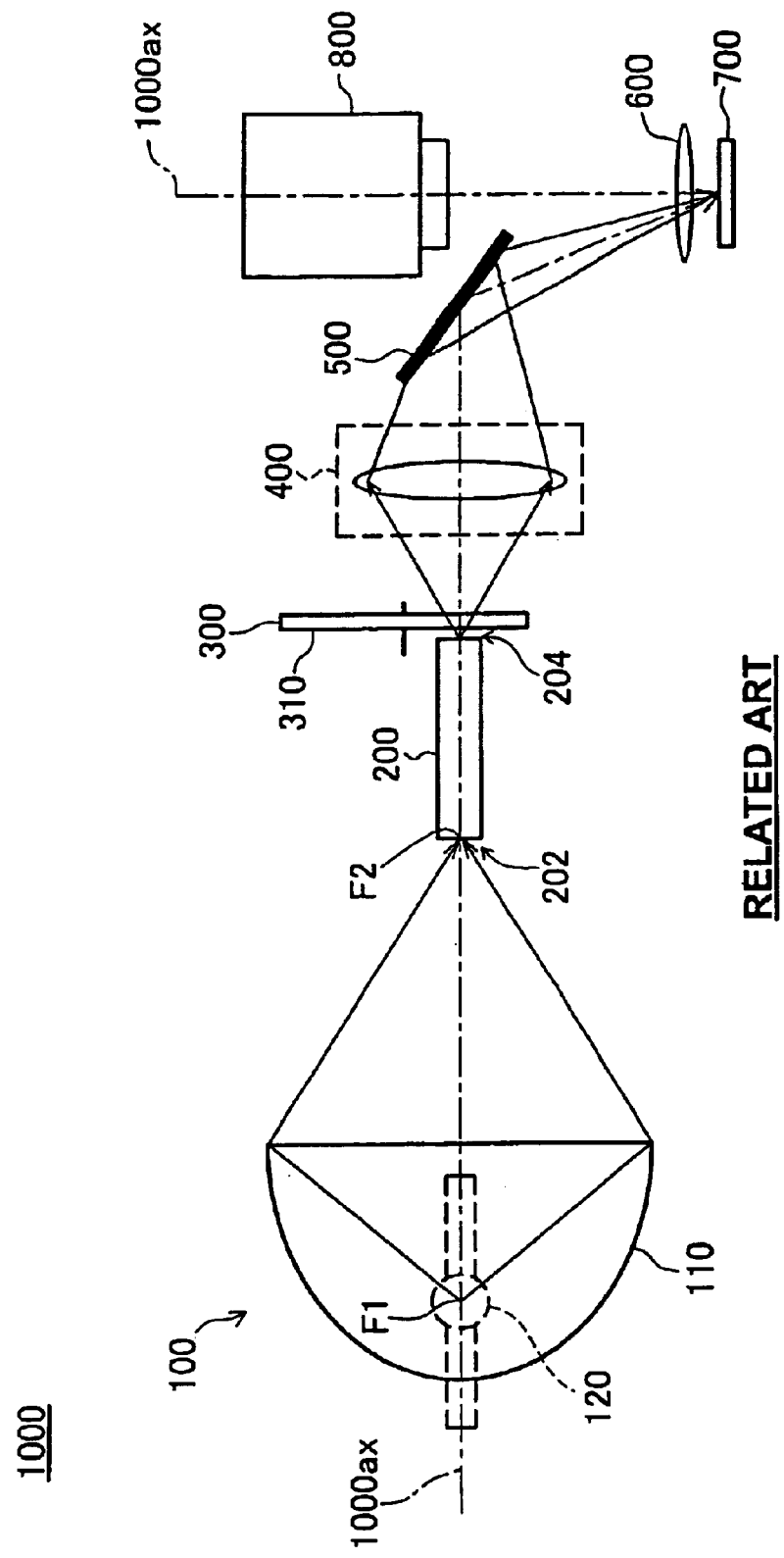
FIG. 5 is a plan view schematically illustrating the main part of a prior art SCR projector.
Figure 6A:
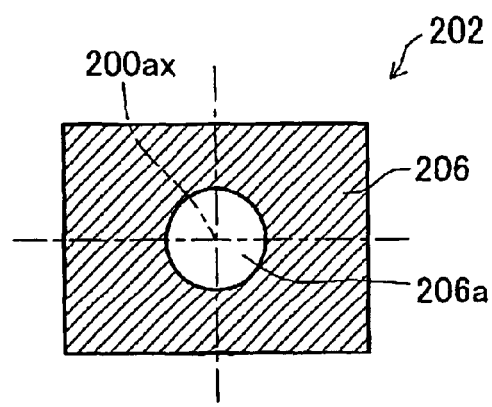
FIGS. 6(A) through 6(C) show the structure of an SCR integrator.
Figure 6B:
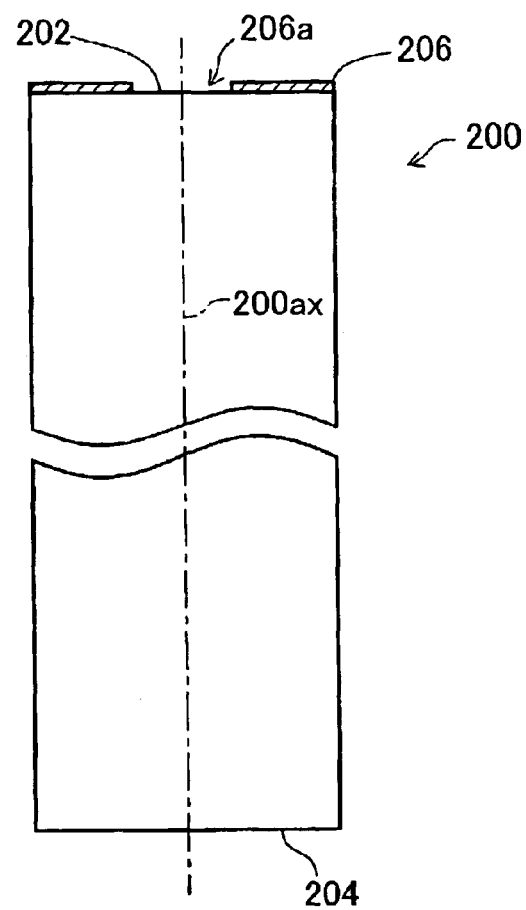
Figure 6C:
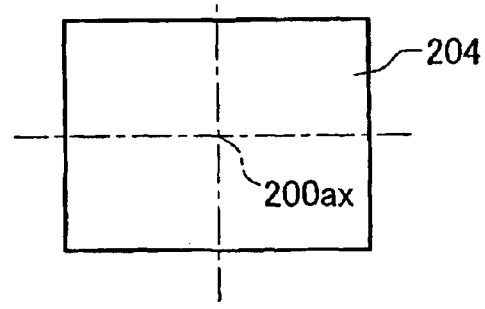
Figure 7:
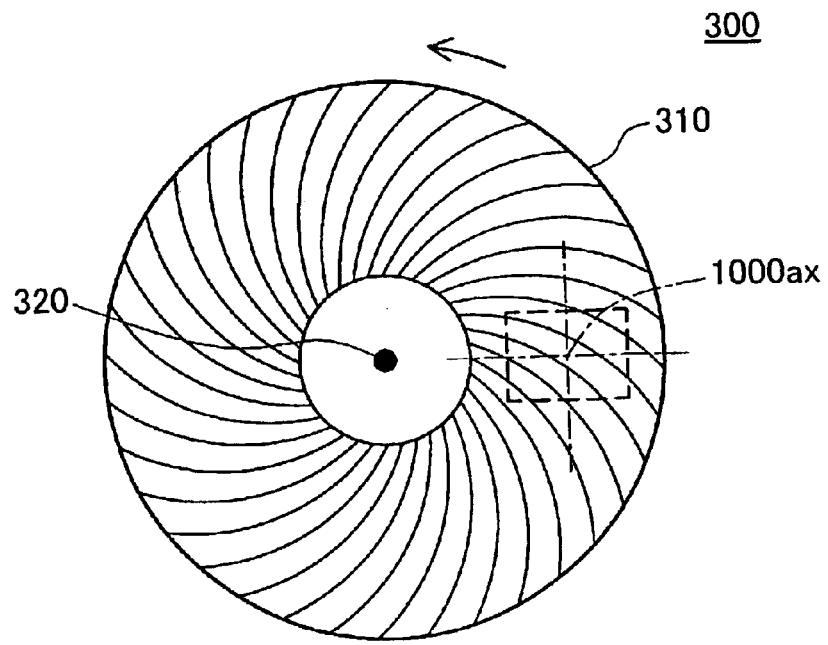
FIG. 7 shows the structure of an SCR wheel.
Figure 8:
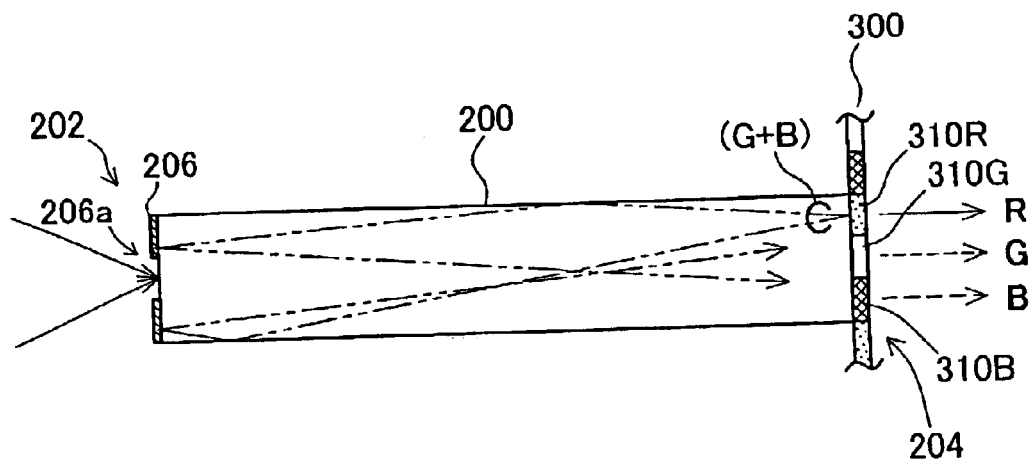
FIG. 8 shows the light reflected by the SCR wheel.
Figure 9A:
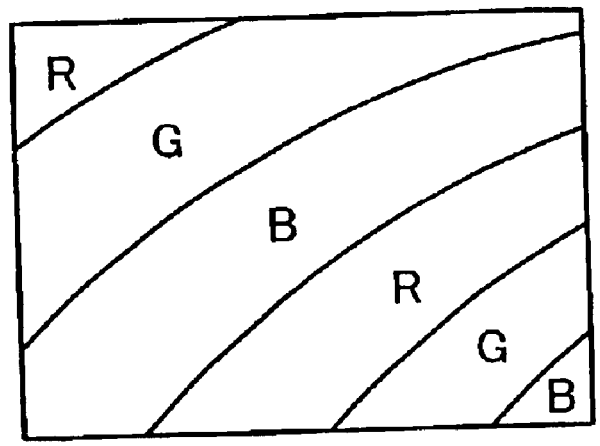
FIGS. 9(A) and 9(B) schematically show an image of the light passing through the SCR wheel.
Figure 9A:
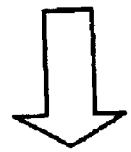
Figure 9B:
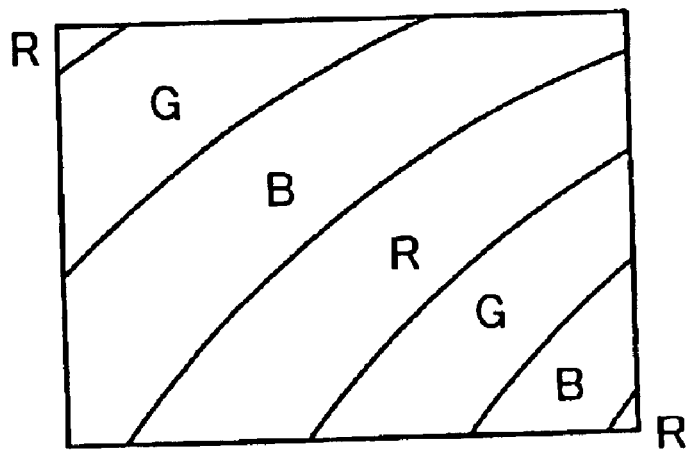
Figure 10A:
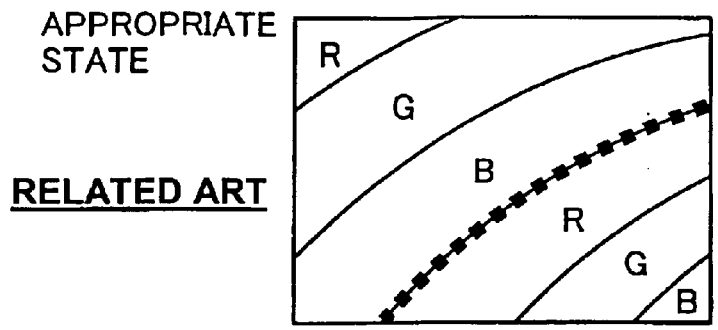
FIGS. 10(A) through 10(D) show problems arising in the prior art SCR projector.
Figure 10B:
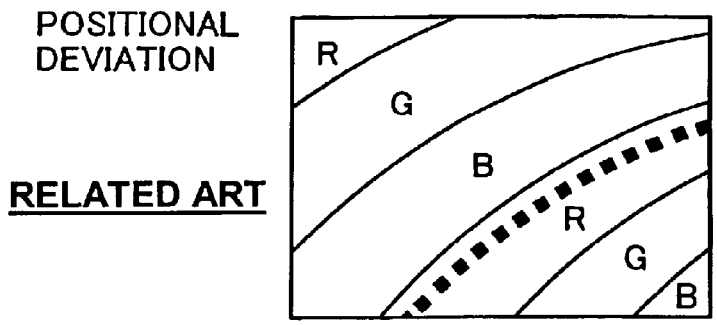
Figure 10C:
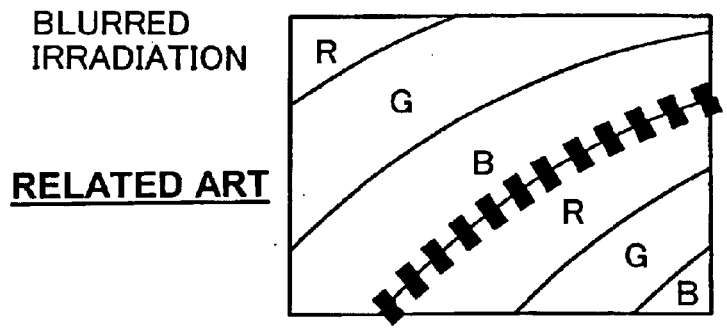
Figure 10D:
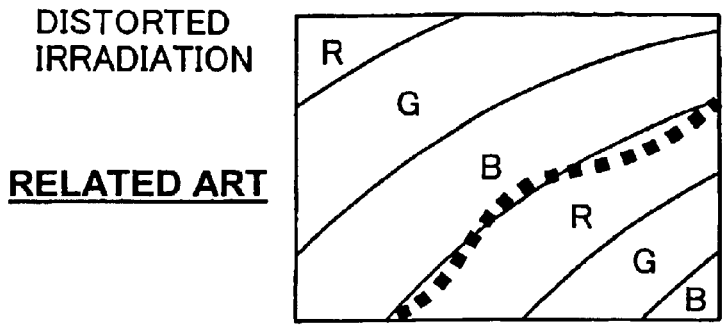

The relay optical system 400' is a compound lens assembly including three double-convex lenses (hereafter may simply be referred to as 'convex lens') 412, 414, and 418 and one double-concave lens (hereafter may simply be referred to as 'concave lens') 416. The relay optical system 400' has functions equivalent to those of one double-convex lens. Like the prior art relay optical system 400 (see FIG. 5), the relay optical system 400' accordingly has the function of focusing the light from the light outgoing plane 204 of the SCR integrator 200 into an image on the light illumination plane of the DMD 700, that is, the function of focusing the light passing through the SCR wheel 300 into an image on the light illumination plane of the DMD 700.

It is preferable that the surfaces of the respective lens components included in the relay optical system 400' are coated with an anti-reflection film to prevent reflection of light rays in a visible light range and thereby enhance the illumination efficiency (also called 'light utilization efficiency') on the light illumination plane of the DMD 700.

The convex planes of the three convex lenses 412, 414, and 418 are formed to favorably reduce at least distortion aberration among diverse aberrations that may occur in the image formed by focusing the light on the light illumination plane of the DMD 700. It is, however, not necessary that the whole convex plane of each convex lens is formed to reduce the distortion aberration. The only requirement is that a specific part of the convex plane corresponding to at least an entrance range of the light emitted from the SCR wheel 300 is formed to reduce the distortion aberration.

The convex lenses are preferably made of a plastic (resin) material having a high degree of transparency and a high light transmittance, such as an acrylic resin material or an olefin resin material. The plastic materials are preferable because of their easiness in working and low manufacturing cost, although optical glass materials are also usable.

The concave lens 416 has a spherical concave plane. The chromatic aberration caused by the concave lens generally has the characteristics opposite to those of the chromatic aberration caused by the convex lens. The concave lens 416 is accordingly made of an optical glass material, which has dispersion properties to cancel the chromatic aberration possibly arising due to the three convex lenses 412, 414, and 418. Preferable is the optical glass material having an Abbe's number of not greater than 40. The material of the concave lens 416 is, however, not restricted to the optical glass material, but the concave lens 416 may be composed of any optical material that is capable of canceling the chromatic aberration possibly arising due to the three convex lenses 412, 414, and 418.

As described above, the relay optical system 400' is capable of reducing at least the distortion aberration and the chromatic aberration among the diverse aberrations that may occur in the image of the light output from the light outgoing plane 204 of the SCR integrator 200 and focused on the light illumination plane of the DMD 700. The SCR projector 1000A including this relay optical system 400' accordingly suppresses the occurrence of at least the distortion aberration and the chromatic aberration and enables all borderlines between divisional areas of multiple color light components included in the light passing through the SCR wheel 300 to be focused on the light illumination plane of the DMD 700 with a high accuracy, thus enhancing the quality of a resulting displayed image.

In the relay optical system 400', the convex planes of all the three convex lenses 412, 414, and 418 are formed to favorably reduce at least the distortion aberration among the diverse aberrations that may occur in the image of the light focused on the light illumination plane of the DMD 700. In one modified structure, the convex plane of at least one convex lens selected out of the three convex lenses 412, 414, and 418 may be formed to favorably reduce at least the distortion aberration among the diverse aberrations that may occur in the image of the light focused on the light illumination plane of the DMD 700.

In one preferable application, an infrared reflection filter for reflecting infrared radiation is disposed at any adequate position in the optical path between the light source unit 100 and the relay optical system 400'. The infrared reflection filter reflects, for example, infrared rays of about 700 nm to about 2000 nm.

In one example, it is assumed that an acrylic resin material is applied for the convex lenses of the relay optical system 400'. Acrylic resins have light absorption bands of about 1200 nm, 1400 nm, and 1700 nm. Absorption of light rays in these bands may cause evolution of heat and resulting deterioration of the acrylic resin. The infrared reflection filter effectively prevents deterioration due to the evolution of heat, when the convex lenses of the relay optical system are made of the acrylic resin material.

B. Modifications

The above embodiment and its applications are to be considered in all aspects as illustrative and not restrictive. There may be many modifications, changes, and alterations without departing from the scope or spirit of the main characteristics of the present invention. Some examples of possible modification are given below.

B1. Modified Examples 1

The relay optical system 400' of the embodiment is the compound lens assembly including three double-convex lenses 412, 414, and 418 and one double-concave lens 416 disposed between the two double-convex lenses 414 and 418. The relay optical system is, however, not restricted to this structure.

Figure 2A:
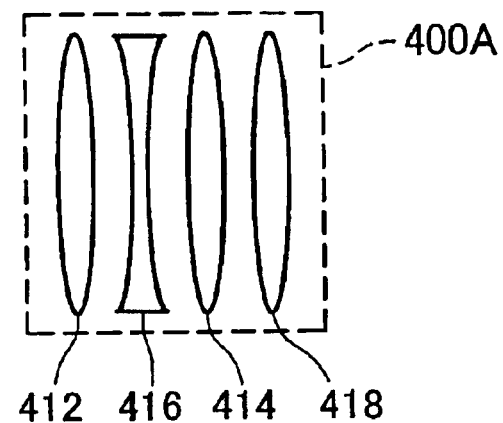
FIGS. 2(A) through 2(C) show relay optical systems of modified examples.
Figure 2B:
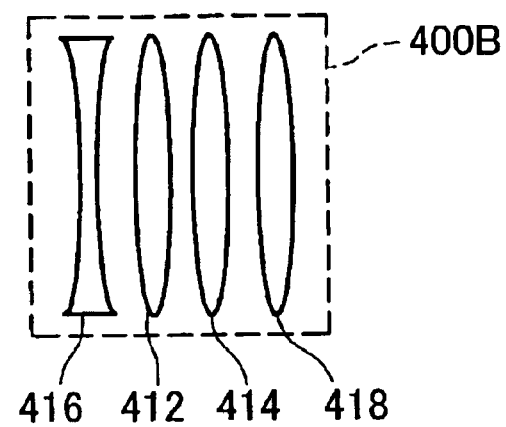
Figure 2C:
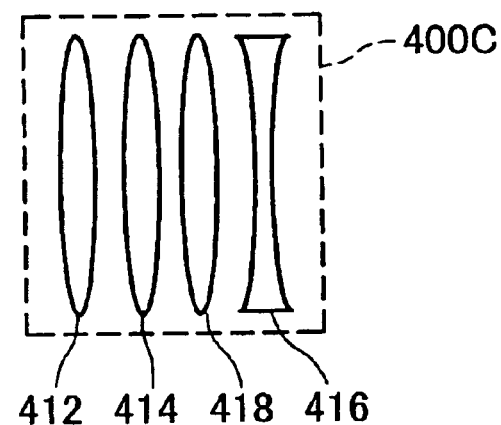

FIG. 2 shows relay optical systems of modified examples. A relay optical system 400A shown in FIG. 2(A) has the double-concave lens 416 disposed between the two double-convex lenses 412 and 414. A relay optical system 400B shown in FIG. 2(B) has the double-concave lens 416 at a forefront position facing to the SCR wheel 300. A relay optical system 400C shown in FIG. 2(C) has the double-concave lens 416 at a backmost position facing to the reflecting mirror 500.

Figure 3A:
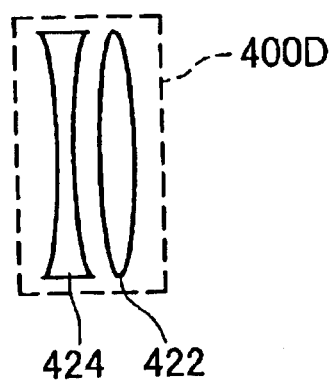
FIGS. 3(A) and 3(B) show relay optical systems of other modified examples.
Figure 3B:
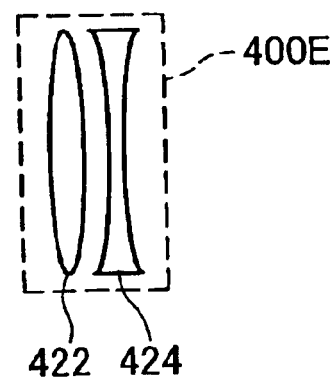

FIG. 3 shows relay optical systems of other modified examples. Each of relay optical systems 400D and 400E shown in FIGS. 3(A) and 3(B) consists of two single lenses, that is, one double-convex lens 422 and one double-concave lens 424. The positional relationship between the double-convex lens 422 and the double-concave lens 424 in the relay optical system 400D of FIG. 3(A) is opposite to that in the relay optical system 400E of FIG. 3(B).

Like the double-convex lenses 412, 414, and 418 included in the relay optical system 400' of the embodiment, the double-convex lens 422 is formed to favorably reduce at least the distortion aberration among the diverse aberrations that may occur in the image of the light focused on the light illumination plane of the DMD 700. Like the double-concave lens 416 included in the relay optical system 400' of the embodiment, the double-convex lens 424 is formed to cancel the chromatic aberration possibly arising due to the double-convex lens 422.

In the embodiment and its modified examples discussed above, the compound lens assembly of the relay optical system includes only one double-concave lens. The relay optical system may, however, include multiple double-concave lenses.

In the above embodiment and its modified examples, the double-convex lens is applied for the relay optical system. The double-convex lens may be replaced by any of various focusing lenses (positive lenses, convex lenses) including plano-convex lenses, convex-plane lenses, convex-concave lenses, and concavo-convex lenses. In the above embodiment and its modified examples, the double-concave lens is applied for the relay optical system. The double-concave lens may be replaced by any of various diverging lenses (negative lenses, concave lenses) including convex-concave lenses, plano-concave lenses, concave-plane lenses, and concavo-convex lenses.

Namely the compound lens assembly of the relay optical system is required to include at least one focusing lens formed to favorably reduce at least the distortion aberration among the diverse aberrations that may occur in the image of the light focused on the light illumination plane of the DMD 700, and at least one diverging lens formed to reduce the chromatic aberration.

FIG. 4 shows relay optical systems of still other modified examples.

Figure 4A:
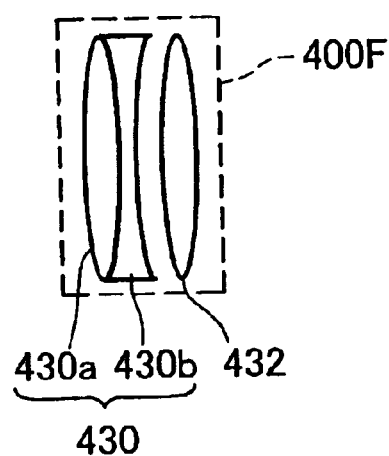
FIGS. 4(A) and 4(B) show relay optical systems of still other modified example.
Figure 4B:
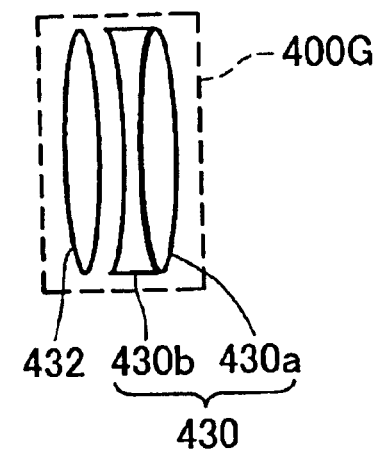

Each of relay optical systems 400F and 400G shown in FIGS. 4(A) and 4(B) consists of one composite lens 430 and one double-convex lens 432.

Like the double-convex lenses 412, 414, and 418 included in the relay optical system 400' of the embodiment, the double-convex lens 432 is formed to favorably reduce at least the distortion aberration among the diverse aberrations that may occur in the image of the light focused on the light illumination plane of the DMD 700. The composite lens 430 is used as the diverging lens for reducing the chromatic aberration caused by the double-convex lens 432. The composite lens 430 includes a double-convex lens 430a having a spherical convex plane and a double-concave lens 430b having a spherical concave plane.

The double-convex lens 430a and the double-concave lens 430b are composed of an optical glass material. In order to cancel the chromatic aberration, the double-concave lens 430b is preferably composed of an optical glass material that has high dispersive power and an Abbe's number of not greater than 40. The double-convex lens 430a may alternatively be composed of an ultra-low dispersive optical glass material or an abnormal dispersive optical glass material.

In the modified examples of FIG. 4, the compound lens includes one double-convex lens 432 and one composite lens 430. Like the relay optical system 400' of the embodiment, the compound lens may include two or more focusing lenses and one composite lens functioning as the diverging lens. The compound lens may also include two or more composite lenses.

B2. Modified Example 2

In the above embodiment, the light source unit 100 has the elliptical reflector 110 for emitting condensed light. The light source unit may have a parabola reflector having a paraboloid of revolution. The parabola reflector reflects the incident rays to quasi parallel rays. In the structure with the parabola reflector, a lens for condensing the quasi parallel rays is to be located before the reflection optical system 420.

B3. Modified Example 3

The above embodiment regards the SCR projector including the DMD as the electro-optic device. The principle of the present invention is also applicable to an SCR projector including one liquid crystal panel. In general, the present invention is applicable to any SCR projector including any electro-optic device that modulates the incident light according to image information.

The scope and spirit of the present invention are indicated by the appended claims, rather than by the foregoing description.

What is claimed is:

1. A projector that projects an image, the projector comprising:
   a light source unit that emits condensed light, which is focused at a preset position on a central axis;
   an integrator rod that has a light entrance plane in a neighborhood of the preset position and uniformizes the light emitted from the light source unit;

a color wheel that is located close to a light outgoing plane of the integrator rod;

a relay optical system that functions to focus light from the light outgoing plane of the integrator rod into an image on a predetermined illumination area;

an electro-optic device that has the predetermined illumination area and generates image light, which represents an image, from light output from the relay optical system to irradiate the predetermined illumination area; and a projection optical system that projects a resulting image corresponding to the image light output from the electro-optic device, a reflecting mirror being formed on the light entrance plane of the integrator rod, the reflecting mirror having an opening about the central axis and a reflecting plane that is formed to surround the opening and reflects light going from the light outgoing plane to the light entrance plane inside the integrator rod, the color wheel having multiple reflection-type color filters, each allowing transmission of a desired color light component and reflecting the other color light components, which are arranged thereon in a spiral form to divide the light output from the integrator rod into multiple color light components and allow transmission of the multiple color light components, the color wheel being rotated about a rotating shaft that is parallel to the central axis to cyclically change divisional areas of multiple color light components included in the light passing through the color wheel, the relay optical system comprising a first optical element for correcting at least a distortion aberration, and a second optical element for correcting at least a chromatic aberration, among aberrations possibly arising in the image of the light focused on the predetermined illumination area.

2. A projector in accordance with claim 1, wherein the first optical element includes at least one focusing lens having a non-spherical convex plane, and the second optical element includes at least one diverging lens having a spherical concave plane.

3. A projector in accordance with claim 2, wherein the diverging lens is composed of a relatively high dispersive optical glass material having an Abbe's number of not greater than 40.

4. A projector in accordance with claim 2, wherein the diverging lens is a composite lens, which includes a convex lens having a spherical convex plane joined with a concave lens having a spherical concave plane.

5. A projector in accordance with claim 4, wherein the concave lens of the composite lens is composed of a relatively high dispersive optical glass material having an Abbe's number of not greater than 40.

6. A projector in accordance with claim 4, wherein the convex lens of the composite lens is composed of either one of an ultra-low dispersive optical glass material and an abnormal dispersive optical glass.

7. A projector in accordance with claim 2, wherein the focusing lens is composed of either one of an acrylic resin material and an olefin resin material.

8. A projector in accordance with claim 3, wherein the focusing lens is composed of either one of an acrylic resin material and an olefin resin material.

9. A projector in accordance with claim 4, wherein the focusing lens is composed of either one of an acrylic resin material and an olefin resin material.

10. A projector in accordance with claim 5, wherein the focusing lens is composed of either one of an acrylic resin material and an olefin resin material.

11. A projector in accordance with claim 6, wherein the focusing lens is composed of either one of an acrylic resin material and an olefin resin material.

12. A projector in accordance with claim 1, the projector further comprising an infrared reflection filter that is disposed in an optical path between the light source unit and the relay optical system and reflects infrared radiation of about 700 nm to about 2000 nm.

13. A projector in accordance with claim 2, the projector further comprising an infrared reflection filter that is disposed in an optical path between the light source unit and the relay optical system and reflects infrared radiation of about 700 nm to about 2000 nm.

14. A projector in accordance with claim 3, the projector further comprising an infrared reflection filter that is disposed in an optical path between the light source unit and the relay optical system and reflects infrared radiation of about 700 nm to about 2000 nm.

15. A projector in accordance with claim 4, the projector further comprising an infrared reflection filter that is disposed in an optical path between the light source unit and the relay optical system and reflects infrared radiation of about 700 nm to about 2000 nm.

16. A projector in accordance with claim 5, the projector further comprising an infrared reflection filter that is disposed in an optical path between the light source unit and the relay optical system and reflects infrared radiation of about 700 nm to about 2000 nm.

17. A projector in accordance with claim 6, the projector further comprising an infrared reflection filter that is disposed in an optical path between the light source unit and the relay optical system and reflects infrared radiation of about 700 nm to about 2000 nm.

18. A projector in accordance with claim 7, the projector further comprising an infrared reflection filter that is disposed in an optical path between the light source unit and the relay optical system and reflects infrared radiation of about 700 nm to about 2000 nm.

* * * * *